US007579068B2

(12) United States Patent
Allen et al.

(10) Patent No.: US 7,579,068 B2
(45) Date of Patent: Aug. 25, 2009

(54) RIGID POLYURETHANE-ISOCYANURATE REINFORCING FOAMS

(75) Inventors: Mark P. Allen, Bruce Township, MI (US); Huzeir Lekovic, Troy, MI (US); Srikanth Miryala, Farmington Hills, MI (US); Arnold W. Braun, Jr., Trenton, MI (US)

(73) Assignee: Dow Global Technologies, Inc., Midland, MI (US)

( * ) Notice: Subject to any disclaimer, the term of this patent is extended or adjusted under 35 U.S.C. 154(b) by 368 days.

(21) Appl. No.: 11/272,554

(22) Filed: Nov. 10, 2005

(65) Prior Publication Data

US 2006/0222838 A1 Oct. 5, 2006

Related U.S. Application Data

(60) Provisional application No. 60/668,521, filed on Apr. 5, 2005.

(51) Int. Cl.
*B32B 3/26* (2006.01)
*B32B 7/12* (2006.01)
*B61D 17/12* (2006.01)
*B29C 65/00* (2006.01)

(52) U.S. Cl. .................. 428/304.4; 428/343; 52/745.19; 264/46.5

(58) Field of Classification Search .............. 428/304.4, 428/343; 52/745.19; 264/46.5
See application file for complete search history.

(56) References Cited

U.S. PATENT DOCUMENTS 5,755,486 A    5/1998    Wycech
5,806,919 A    9/1998    Davies
6,040,350 A    3/2000    Fukui
6,068,424 A    5/2000    Wycech
6,268,402 B1   7/2001    Wilson et al.
6,455,605 B1 * 9/2002    Giorgini et al. ............. 521/163
6,602,927 B1   8/2003    Rothacker
6,710,095 B2   3/2004    Araullo-McAdams
7,097,794 B2 * 8/2006    McLeod et al. ............. 264/46.5
2002/0102390 A1 8/2002  O'Neill
2003/0194548 A1 * 10/2003 McLeod et al. .......... 428/304.4
2004/0255546 A1 * 12/2004 Sophiea et al. ........... 52/745.19

FOREIGN PATENT DOCUMENTS

WO    WO 01/68734 A    9/2001
WO    WO 02/28936 A    4/2002

\* cited by examiner

*Primary Examiner*—Victor S Chang
(74) *Attorney, Agent, or Firm*—Gary C. Cohn, PLLC

(57) ABSTRACT

A structural member is reinforced with a thermoset polymer foam having (a) a density of 80-650 kg/m$^3$, (b) a storage modulus, measured on a 12 mm wide×3.5 mm thick×17.5 single cantilever sample according to ASTM D 4065-01, under conditions of 1 Hz and a heating rate of 2° C./min, such that the ratio of the storage modulus at 0° C., expressed in MPa, divided by the density of the thermoset polymer foam, expressed in kg/m$^3$, is at least 0.4, and (c) the ratio of the storage modulus of the thermoset polymer foam at 100° C. divided by the storage modulus of the thermoset polymer foam at 0° C. is at least 0.5. The foam is preferably a polyurethane-isocyanurate foam. The foam exhibits excellent resistance to cracking due to mechanical and thermal stresses.

18 Claims, No Drawings

RIGID POLYURETHANE-ISOCYANURATE REINFORCING FOAMS

CROSS-REFERENCE TO RELATED APPLICATION

This application claims benefit of U.S. Provisional Application No. 60/668,521, filed Apr. 5, 2005.

BACKGROUND OF THE INVENTION

The present invention relates to reinforcing foams for strengthening structural elements that contain a cavity.

Manufacturers are continually looking for ways to reduce the weight of automobiles. A common approach is to replace heavy metal parts with lighter plastic ones. This works well when the part does not bear heavy loads and is not subjected to great mechanical stresses during production and use. However, it is difficult to replace a metal part with a plastic one when the part is called upon to withstand high loads or mechanical stresses. The mechanical properties of plastics rarely match those of metals.

Therefore, a compromise approach has been developed which permits lighter-weight metal parts to be substituted for heavier ones. This approach makes use of a structural member, typically a metal, which is reinforced with a polymer foam. The polymer foam is inserted into a cavity in the structural member and an adhesive secures the foam to the structural member. This approach allows thinner-gauge or smaller metal parts to be used, with the resulting loss of mechanical properties being at least partially compensated for by the structural foam insert. In some cases, this approach allows the complete replacement of metal with lighter-weight polymers.

It is possible to form the reinforcing polymer foam in place within the cavity of the structural member. This technique is often used for applying spot reinforcement on vehicle assemblies or sub-assemblies having accessible cavities. A curable foam formulation is poured, sprayed or injected into the cavity and cures in place to form the reinforcement.

It is often convenient for manufacturing reasons to form the structural member and polymer foam separately, and then affix the foam to the structural member in a separate step. This can often be done by forming a polymer foam insert that is slightly smaller than the cavity it will fill. All or part of the foam surface is covered with a layer of a thermally expandable adhesive. The resulting structural foam insert ("SFI") is then placed within the cavity and heated so that the expandable adhesive expands, filling the remaining space in the cavity and adhering the polymer foam to the structural member. This process is described, for example, in U.S. Pat. No. 5,194,199 to Thum, U.S. Pat. No. 5,755,486 to Wycech, U.S. Pat. No. 5,806,919 to Davies and U.S. Pat. No. 6,068,424 to Wycech, among others. Automobile manufacturers usually incorporate the thermal expansion step into a primer curing step.

A polyurethane foam is commonly used in these reinforcing applications, either as a foam-in-place reinforcement or as the core of these SFIs. The polyurethane has the advantage of being a thermoset, which makes it less likely to melt or flow when exposed to elevated temperatures and also tends to increase its dimensional stability. Polyurethane foams also can be polymerized, expanded and shaped to fit within the cavity in a single processing step. Wasteful fabrication steps that are needed with thermoplastic foams can be avoided, which reduces the cost of the insert.

The polymer foam core often is subjected to substantial stresses over the life of the part. The stresses can arise from a number of factors, including thermal expansion and contraction, vibrations and impact events, and exposure to fluids. Sometimes microcracks or even larger defects develop as a result of these conditions. In the case of SFIs, very substantial stresses are incurred during the step of expanding the adhesive. The thermal expansion and contraction of the structural member and of the foam itself due to heating and cooling can also induce stresses. These stresses sometimes cause polyurethane foam reinforcements to crack or break apart, weakening the entire assembly.

In addition, the polyurethane foams that are used in these applications often exhibit a significant drop-off in mechanical properties at higher use temperatures. This weakens the structure at higher temperatures such as might be encountered during summer months or in other hot environments. Some parts that are located near hot engine parts can experience these temperatures even during the winter in cold climates.

It would be desirable to provide a polymer foam reinforcement that is more resistant to cracking or other mechanical breakdown during the step of expanding the adhesive layer. It would be further desirable a polymer foam reinforcement that retains more of its mechanical strength at temperatures in the range of 45-100° C.

SUMMARY OF THE INVENTION

In one aspect, this invention is a structural member comprising a cavity containing a reinforcing foam, wherein the reinforcing foam is a structural thermoset polymer foam having (a) a density of 80-650 kg/m$^3$, (b) a storage modulus, such that the ratio of the storage modulus at 0° C., expressed in MPa, divided by the density of the thermoset polymer foam, expressed in kg/m$^3$, is at least 0.4, and (c) the ratio of the storage modulus of the thermoset polymer foam at 100° C. divided by the storage modulus of the thermoset polymer foam at 0° C. is at least 0.5. Storage modulus, for purposes of this invention, is measured on a 12 mm wide×3.5 mm thick×17.5 mm long single cantilever sample according to ASTM D 4065-01, under conditions of 1 Hz and a heating rate of 2° C./min.

This invention is also a structural member as described above wherein the reinforcing foam is a structural polyurethane-isocyanurate polymer foam which is formed in the reaction of components (a) and (b) in the presence of a blowing agent, wherein:

component (a) includes a polyol or mixture thereof, the polyol or mixture thereof having an average hydroxyl functionality of at least 3.5 hydroxyl groups/molecule and a hydroxyl equivalent weight of from 160 to 220;

component (b) includes an organic polyisocyanate or mixture thereof, the polyisocyanate or mixture thereof having an isocyanate equivalent weight of from 130-170 and an average isocyanate functionality of at least 2.5 isocyanate groups/molecule;

and further wherein the isocyanate index is at least 200.

The reinforced structural members of the invention can be prepared by forming the thermoset foam in place, or by inserting a previously-formed thermoset foam into the cavity of the structural member. Thus, this invention is also a process for reinforcing a structural member as described above comprising inserting a thermoset polymer foam-forming composition into a cavity of the structural member and subjecting the composition to conditions such that it cures in place to form a thermoset polymer foam adherent to the cavity.

The invention is also a method for producing the reinforced structural member of the invention, which comprises (a) applying a thermally expandable adhesive to at least a portion of the outer surface of a structural thermoset polymer foam to form a reinforcing insert, (b) placing the reinforcing insert into a cavity of a structural member, and (b) exposing the thermally expandable adhesive to a temperature sufficient to cause the adhesive to expand and adhere the insert core to the structural member The invention is also a structural foam insert (SFI) useful for preparing a reinforced structural member as described, wherein the reinforcing insert comprises a core of a structural thermoset polymer foam having a thermally expandable adhesive upon at least a portion of its outer surface, the thermoset polymer foam having (a) a density of 80-650 kg/m³, (b) a storage modulus such that the ratio of the storage modulus at 0° C., expressed in MPa, divided by the density of the thermoset polymer foam, expressed in kg/m³, is at least 0.4, and (c) the ratio of the storage modulus of the thermoset polymer foam at 100° C. divided by the storage modulus of the thermoset polymer foam at 0° C. is at least 0.5.

The structural thermoset polymer foam used in the invention is more resistant to cracking during the step of thermally expanding the adhesive layer than are polyurethane foams that have been conventionally used in these applications. The loss of mechanical properties that is caused by such cracking is avoided or at least reduced significantly with this invention. The structural thermoset polymer foam used the invention is also more capable of retaining its mechanical properties when exposed to moderately high (up to 100° C.) temperatures, so the reinforced structural member is more serviceable over a wider range of use temperatures.

DETAILED DESCRIPTION OF THE INVENTION

The thermoset polymer is in one aspect characterized in being a thermoset foam which has the following properties:

(a) A density of from 80 to 650 kg/m³. The density is preferably in the range of from 120 to 540 kg/m³ and is especially from 300 to 450 kg/m³.

(b) A storage modulus such that the ratio of the storage modulus at 0° C., expressed in MPa, divided by the density of the thermoset polymer foam, expressed in kg/m³, is at least 0.4. Units for this ratio can be ignored if the storage modulus and density are expressed in the units just described This ratio is preferably at least 0.5 and is more preferably at least 0.6. This ratio is preferably no greater than 1.2 and more preferably no greater than 1.0. For purposes of this invention, all storage modulus measurements are determined according to ASTM D 4065-01 on a 12×3.5×17.5 mm single cantilever sample. Test conditions are 1 Hz and heating at 2° C./min. All foam densities are core densities measured at 22±3° C. according to ASTM D 3574. "Core densities" represent measurements of density after the removal of any skin or densified areas on the outer portion of the foam.

(c) The ratio of the storage modulus of the thermoset polymer foam at 100° C. divided by the storage modulus of the thermoset polymer foam at 0° C. is at least 0.5. This ratio is preferably at least 0.6 and even more preferably at least 0.65. This ratio generally will not exceed 1.0.

One thermoset foam of particular interest herein is a polyurethane-isocyanurate foam. A suitable polyurethane-isocyanurate foam is one that is prepared in the reaction of a polyol or polyol mixture with an excess of a polyisocyanate or polyisocyanate mixture, in the presence of a blowing agent.

The polyol or polyol mixture suitably has an average hydroxyl functionality of at least 3.5 hydroxyl groups/molecule and a hydroxyl equivalent weight of from 160 to 220. The weight of non-isocyanate reactive materials and water (if present) is not considered in determining hydroxyl functionality and equivalent weight of the polyol mixture.

The average hydroxyl functionality is preferably about 3.5 up to about 5.0. Lower functionality polyols tend to form foam that loses more of its mechanical properties at higher temperatures, whereas higher functionality polyols tend to increase foam brittleness. A more preferred average hydroxyl functionality is from about 3.7 to about 4.5. An average hydroxyl functionality of particular interest is from about 3.7 to about 4.1.

The average hydroxyl equivalent weight is preferably from about 160 to 200, and is more preferably from about 170 to 190. Higher equivalent weight polyol mixtures tend to form a foam that loses more of its mechanical properties at higher temperatures, whereas using lower equivalent weight polyols tends to form a more brittle foam.

When a single polyol is used, it should meet the hydroxyl equivalent weight and functionality parameters set forth above. If a mixture of polyols is used, the mixture as a whole should meet those parameters, although any individual polyol within the mixture may have a functionality and equivalent weight outside of those ranges.

Suitable polyols include compounds such as alkylene glycols (e.g., ethylene glycol, propylene glycol, 1,4-butane diol, 1,6-hexanediol and the like), glycol ethers (such as diethylene glycol, triethylene glycol, dipropylene glycol, tripropylene glycol and the like), glycerine, trimethylolpropane, tertiary amine-containing polyols such as triethanolamine, triisopropanolamine, and ethylene oxide and/or propylene oxide adducts of ethylene diamine, toluene diamine and the like, polyether polyols, polyester polyols, and the like. Among the suitable polyether polyols are polymers of alkylene oxides such as ethylene oxide, propylene oxide and 1,2-butylene oxide or mixtures of such alkylene oxides. Preferred polyethers are polypropylene oxides or polymers of a mixture of propylene oxide and a small amount (up to 12 weight percent) ethylene oxide.

Polyester polyols may also be used, but are generally less preferred as they tend to have lower functionalities than desired. They are most beneficially used in combination with other, higher functionality polyols. The polyester polyols include reaction products of polyols, preferably diols, with polycarboxylic acids or their anhydrides, preferably dicarboxylic acids or dicarboxylic acid anhydrides. The polycarboxylic acids or anhydrides may be aliphatic, cycloaliphatic, aromatic and/or heterocyclic and may be substituted, such as with halogen atoms. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The polyols used in making the polyester polyols include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerine, trimethylol propane, 1,2,6-hexane triol, 1,2,4-butane triol, trimethylol ethane, pentaerythritol, quinitol, mannitol, sorbitol, methyl glycoside, diethylene glycol, triethylene glycol, tetraethylene glycol, dipropylene glycol, dibutylene glycol and the like.

The polyisocyanate component comprises at least one organic polyisocyanate. The organic polyisocyanate or mixture thereof advantageously contains an average of at least 2.5 isocyanate groups per molecule. A preferred isocyanate functionality is from about 2.5 to about 3.6 or from about 2.6 to about 3.3 isocyanate groups/molecule. The polyisocyanate or mixture thereof advantageously has an isocyanate equivalent weight of from about 130 to 200. This is preferably from 130 to 185 and more preferably from 130 to 170. As before, non-isocyanate-functional materials contained within the polyisocyanate component are not considered in determining isocyanate functionality and equivalent weight. Also as before, these functionality and equivalent weight values need not apply with respect to any single polyisocyanate in a mixture, provided that the mixture as a whole meets these values.

Suitable polyisocyanates include aromatic, aliphatic and cycloaliphatic polyisocyanates. Aromatic polyisocyanates are generally preferred. Exemplary polyisocyanates include, for example, m-phenylene diisocyanate, 2,4- and/or 2,6-toluene diisocyanate (TDI), the various isomers of diphenylmethanediisocyanate (MDI), hexamethylene-1,6-diisocyanate, tetramethylene-1,4-diisocyanate, cyclohexane-1,4-diisocyanate, hexahydrotoluene diisocyanate, hydrogenated MDI ($H_{12}$ MDI), naphthylene-1,5-diisocyanate, methoxyphenyl-2,4-diisocyanate, 4,4'-biphenylene diisocyanate, 3,3'-dimethyoxy-4,4'-biphenyl diisocyanate, 3,3'-dimethyldiphenylmethane-4,4'-diisocyanate, 4,4',4"-triphenylmethane diisocyanate, polymethylene polyphenylisocyanates, hydrogenated polymethylene polyphenyl polyisocyanates, toluene-2,4,6-triisocyanate and 4,4'-dimethyldiphenylmethane-2,2',5,5'-tetraisocyanate. Preferred polyisocyanates include TDI, MDI and the so-called polymeric MDI products, which are a mixture of polymethylene polyphenylene polyisocyanates in monomeric MDI. Especially suitable polymeric MDI products have a free MDI content of from 5 to 50% by weight, more preferably 10 to 40% by weight. Such polymeric MDI products are available from The Dow Chemical Company under the trade name PAPI®.

Isocyanate-terminated prepolymers and quasi-prepolymers (mixtures of prepolymers with unreacted polyisocyanate compounds) can also be used. These are prepared by reacting a stoichiometric excess of an organic polyisocyanate with a polyol, such as the polyols described above. Suitable methods for preparing these prepolymers are well known.

The polyisocyanate and polyol components are reacted at an isocyanate index of at least 200, in the presence of a blowing agent. Isocyanate index is calculated as the number of reactive isocyanate groups provided by the polyisocyanate component divided by the number of isocyanate-reactive groups in the foam formulation (including isocyanate-reactive blowing agents such as water) and multiplying by 100. An isocyanate index of 200 therefore indicates that there are 2 isocyanate groups present in the reaction mixture for every isocyanate-reactive group. Water is considered to have two isocyanate-reactive groups per molecule for purposes of calculating isocyanate index. A preferred isocyanate index is from 225 to 400. A more preferred isocyanate index is from 240 to 300.

The reactive system includes a blowing agent. Although physical blowing agents such as fluorocarbons, hydrofluorocarbons, chlorocarbons, chlorofluorocarbons and hydrochlorofluorocarbons can be used, the preferred blowing agents are chemical blowing agents that produce carbon dioxide during the foaming reaction. Among these chemical blowing agents are materials such as formate-blocked amines and water. The formate-blocked amines decompose under the foaming conditions to produce carbon dioxide. Water reacts with the polyisocyanate to form carbon dioxide gas that causes the reaction mixture to expand. Water is the most preferred blowing agent.

Blowing agents that do not react with the polyisocyanate can be incorporated into either the polyisocyanate component of the polyol component. Water or other isocyanate-reactive blowing agents are generally formulated into the polyol component.

The blowing agent is used in an amount sufficient to provide the foam with a density as specified before. When water is used as the sole blowing agent, a suitable amount of water is 0.1 to 5, preferably from 0.15 to about 2 and especially from 0.175 to 0.80 parts by weight per 100 parts of polyol component.

The reactive system includes a catalyst for the reaction of the polyol(s) and the polyisocyanate, for the trimerization of isocyanate groups to form isocyanurate groups, for the reaction of the polyisocyanate with water (when water is used as a blowing agent) or some combination of these. Some catalysts may perform more than one of these functions. Most typically, this catalyst will be incorporated into the polyol component, but may be incorporated into the polyisocyanate component if the catalyst does not react with isocyanate groups.

Suitable urethane-forming catalysts include those described by U.S. Pat. No. 4,390,645 and in WO 02/079340, both incorporated herein by reference. Representative catalysts include tertiary amine and phosphine compounds, chelates of various metals, acidic metal salts of strong acids; strong bases, alcoholates and phenolates of various metals, salts of organic acids with a variety of metals, organometallic derivatives of tetravalent tin, trivalent and pentavalent As, Sb and Bi and metal carbonyls of iron and cobalt. These catalysts also tend to promote the water-isocyanate reaction. Tertiary amine catalysts are generally preferred. Amine catalysts having a molecular weight of 150 or more, especially of 225 or more, tend to exhibit lower odor and are preferred on that basis.

Another suitable type of catalyst is a heat-activated catalyst that becomes catalytically active at somewhat elevated temperatures, such as from about 45 to 100° C., and especially from 50 to 70° C. Various approaches to preparing heat-activated catalysts are known and are useful in this invention. Tertiary amine compounds can in some instances be blocked with an acid such as phenolic acid or an aliphatic carboxylic acid to form an adduct that decomposes at elevated temperatures to generate an active catalyst. Examples of such materials include blocked 1,8-diaza-bicyclo(5,4,0)undecene-7, which is commercially available from Air Products and Chemicals under the trade names POLYCAT® SA-1 and POLYCAT® SA-102. Other suitable heat-activated catalysts are encapsulated types, in which the active catalyst is contained within an encapsulating material that melts or degrades within the desired temperature range to release the active catalyst. Encapsulated catalysts of this type are described, for example, in U.S. Pat. Nos. 5,601,761 and 6,224,793, both incorporated herein by reference.

The reactive system further contains an isocyanate trimerization catalyst. Trimerization catalysts include strong bases such as alkali metal compounds and certain tertiary amines.

Examples of suitable trimerization catalysts include quaternary ammonium compounds such as benzyl trimethyl ammonium hydroxide, the N-hydroxypropyl trimethylammonium salt of formic acid, alkali metal hydroxides and alkoxides such as sodium methoxide, and potassium hydroxide, alkali metal salts of carboxylic acids, particularly of saturated monocarboxylic acids having from 2 to 12 carbon atoms, such as sodium acetate, potassium adipate, potassium 2-ethyl hexanoate and sodium benzoate. Some tertiary amines such as triethanolamine, triethylamine, tetramethyl guanidine, tri(dimethyl aminopropyl) aziridine, 2,4,6-tris(N, N,N',N'-tetramethyl-1,3-butane diamine) and 2,4,6-tri(dimethylaminomethyl)phenol are also sometimes active trimerization catalysts. Suitable commercially available trimerization catalysts include Dabco® TMR, Dabco® TMR2 and Dabco® TMR3 catalysts, all from Air Products and Chemicals.

The amounts of the catalysts are selected to provide a desired reaction rate. The amount that is used will depend somewhat on the particular catalyst. Catalysts for the isocyanate/polyol reaction are generally used in amounts of from 0.01 to about 2 weight percent, based on the weight of the polyol(s). Trimerization catalysts are suitably used at levels of from about 0.05 to about 6 weight percent, based on the weight of the polyol(s).

In addition to the foregoing ingredients, the polyol component and/or the isocyanate component can contain various auxiliary components as may be useful in making a structural foam, such as surfactants, fillers, colorants, odor masks, flame retardants, biocides, antioxidants, UV stabilizers, antistatic agents, thixotropic agents and cell openers.

Suitable surfactants include commercially available polysiloxane/polyether copolymers, examples of which include Tegostab (trademark of Goldschmidt Chemical Corp.) B-8462 and B-8404 surfactants, and DC-198 and DC-5043 surfactants, available from Air Products and Chemicals.

Examples of suitable flame retardants include phosphorous compounds, halogen-containing compounds and melamine.

Examples of fillers and pigments include calcium carbonate, titanium dioxide, iron oxide, chromium oxide, azo/diazo dyes, phthalocyanines, dioxazines and carbon black.

Examples of UV stabilizers include hydroxybenzotriazoles, zinc dibutyl thiocarbamate, 2,6-ditertiarybutyl catechol, hydroxybenzophenones, hindered amines and phosphites.

Examples of cell openers include silicon-based antifoamers, waxes, finely divided solids, liquid perfluorocarbons, paraffin oils and long chain fatty acids.

The foregoing additives are generally used in small amounts, such as from 0.01 percent to 3 percent each by weight of the polyisocyanate component.

The foam can be made and applied to the structural member in various ways. The foam formulation can be mixed and dispensed directly into the cavity of the structural member, under conditions such that it foams and cures in place.

In another method, the foam is prepared separately by conducting the reaction in a closed mold. The interior dimensions of the mold may approximate the dimensions of the cavity to be filled. In instances where an SFI is to be formed, the mold dimensions are slightly smaller than the cavity to allow space for the thermally expandable adhesive layer and additional space for that layer to expand.

Alternatively, the thermoset structural foam may be fabricated from a larger piece of foam using conventional fabrication methods such as cutting or lathing. In this case, the foam may be prepared using molded foam or slabstock (free-rise) foaming techniques. This method is less preferred as it adds process steps and creates more waste.

In any of these methods, foaming is conveniently done by mixing the polyisocyanate and polyol components and allowing the reactants to react and form a foam. In the foam-in-place and molded foam methods, the polyols are typically but not necessarily blended with the catalysts, blowing agent, surfactant and other auxiliary materials beforehand, and mixed with the polyisocyanate material just prior to introducing the reaction mixture into the mold. In making a slabstock foam for further fabrication, the starting materials may be introduced individually or in various subcombinations into a mixing head where they are mixed and poured into a trough.

It may be desirable to pre-heat the reaction mixture to a moderately elevated temperature, such as from 20 to 100° C., preferably from about 50 to 70° C., in order to promote the reaction and cure of the foam. The starting components can be heated individually, but it is preferred to apply heat during or after their mixing to take advantage of the ability of a heat-activated catalyst to control the reaction profile. The foaming reaction is usually exothermic, so that the heat of reaction drives the cure once the reaction is underway. The mold or structural member can be preheated if desired, such as to 50-70° C., again for purposes of accelerating the cure. It is within the scope of the invention to post-cure the foam to complete the cure and fully develop its properties.

The SFI of certain embodiments of the invention further includes a layer of thermally expandable adhesive covering at least a portion of the surface of the thermoset polymer foam.

The thermally expandable layer is applied after the thermoset polymer foam is prepared and cooled. The method of application is not critical—two convenient ways to doing so are to overmold the expandable layer onto the foam surface, or to separately form a sheet of the expandable adhesive and apply the sheet to the foam. A preformed sheet may be formed on a backing or release layer to facilitate handling and application. The thermally expandable layer is suitably from about 1 to about 5 mm thick, although this may vary somewhat in response to the demands of particular applications of the SFI. It advantageously is capable of expanding to at least twice its original (unexpanded) volume during the expansion step. The layer may expand to as much as five times its original volume, but preferably expands to a volume that is from two to four times its original volume.

One suitable type of thermally expandable layer is a heat-softenable solid material that, at some elevated temperature above its softening temperature, will expand and preferably cure to form an adhesive bond between the thermoset structural foam and the structural member. A preferred class of materials includes one-part epoxy resin compositions that include a heat-activated blowing agent. The blowing agent is advantageously one that becomes activated when heated to a temperature of at least 100° C., preferably at least 120° C. and especially from 120 to 210° C. Blowing agents that become activated by thermal decomposition are particularly preferred. The blowing agent is most preferably a solid until it becomes activated. Examples of such blowing agents include so-called "azo" blowing agents such as azobiscarbonamide and azobisisobutyronitrile, nitroso compounds such as dinitrosopentamethylenetetramine and hydrazide compounds such as p-toluenesulfonyl hydrazide and 4, 4'-oxybenzenesulfonyl hydrazide.

Suitable epoxy resin compositions are described, for example, in U.S. Pat. Nos. 6,040,350, 5,575,526 and U. S. Published Patent Application 2004/0131839. The suitable epoxy resin compositions include one or more epoxy resins, which taken together are solid at temperatures lower than 100° C., especially lower than 120° C., the blowing agent as described, an epoxy curing agent, optionally one or more catalysts for the epoxy-curing reaction, and optionally other additives such as a thickening agent (like a polymethylmethacrylate polymer as described in U.S. Pat. No. 6,040,350 and U.S. 2004/0131839), a surfactant, an inorganic filler, and the like.

The structural member can be any part or assembly of parts that is desired to be reinforced, and has some cavity into which the structural foam can be inserted. By "cavity", it is simply meant some three-dimensional space defined by structural member or portion thereof, which space is capable of receiving the foam (or foam formulation) and in the case of an SFI, retaining the thermally expandable adhesive during the expansion and curing process. The cavity need not be completely enclosed, but may be.

The structural member can be made of any material, provided that the material is capable of withstanding the temperatures needed to activate the thermally expandable adhesive. Metals, thermoplastics, reinforced thermoplastics, thermoset polymers, reinforced thermoset polymers, composites, ceramic materials and the like are all suitable structural members. For automotive applications, metal structural members are of particular interest, due to the desire to replace heavier metal parts with thinner gauge metals reinforced with the insert of the invention.

Examples of automotive parts that can serve as the structural member include upper B-pillars, roof rails, rocker panels, A-pillars, engine cradles, longitudinal rails, cross members and other parts that are load-bearing during normal use or in a collision, or which influence the overall stiffness of the vehicle.

The SFI of the invention can be used in the same manner as conventional structural foam inserts, as described, for example, in U.S. Pat. Nos. 5,194,199, 5,755,486, 5,806,919 and 6,068,424. The SFI is inserted in the cavity of the structural member, and the thermally expandable adhesive is brought to an elevated temperature at which it expands to form an adhesive bond between the structural member and thermoset polymer foam core. Suitable temperatures are from 120° C. to about 220° C., especially from about 140 to 210° C. After the expansion is completed, the assembly is then cooled.

It is generally suitable to provide a gap of about 1 to 25, especially 2 to 6, mm between the surface of the thermoset polymer foam and the interior cavity surface, to allow space for the adhesive and for the adhesive to expand. The mold may be designed so that specialized features are added to the foam, such as dams to prevent undesired run-off of the adhesive during the expansion step or flat surfaces, holes or other features to facilitate assembling other components to the thermoset polymer foam. Localized reinforcing tabs and inserts may be provided in the mold in order to incorporate these into the foam part.

In the automotive applications of particular interest, the expansion step is conveniently performed during a coating curing step, which is sometimes referred to as the "e-coat" curing step. In this process, the structural member including the SFI is assembled onto the vehicle or some sub-assembly thereof. The vehicle is then coated and passed through a curing oven to cure the coating. Conditions in the curing oven are generally sufficient to effect the expansion of the thermally expandable adhesive of the SFI of the invention, so this expansion occurs simultaneously with the paint cure. This process reduces costs and eliminates extra manufacturing steps.

The following examples are provided to illustrate the invention, but are not intended to limit the scope thereof. All parts and percentages are by weight unless otherwise indicated.

EXAMPLE 1

A polyurethane-isocyanate structural foam core is prepared by pouring about 300 grams of a foam formulation into a T-shaped mold. The components are preheated to ~32° C. and the mold is preheated to 60° C. The core is demolded after three minutes. The foam formulation is as set out in Table 1. The polyols together have an average –OH functionality of ~3.9 and a hydroxyl equivalent weight of ~179.

TABLE 1

| Component | Parts by Weight |
|---|---|
| Polyether Polyol A[1] | 24.67 |
| Polyether Polyol B[2] | 66.8 |
| Catalyst A[3] | 5.0 |
| Catalyst B[4] | 0.5 |
| Silicone Surfactant A[5] | 2.8 |
| Water | 0.33 |
| Polyisocyanate A[6] | To 250 Index |

[1] A ~240 equivalent weight, 3 functionality polyether polyol available as Voranol ® 270 polyol from Dow Chemical.
[2] A ~156 equivalent weight, 4.5 functionality polyether polyol available as Voranol 360 polyol from Dow Chemical.
[3] A commercial trimerization catalyst containing tri(dimethylaminopropyl) aziridine, sold as Polycat ® 41 by Air Products and Chemicals.
[4] A commercial blowing catalyst containing bis(dimethylaminoethyl)ether, sold as Dabco ® BL-11 by Air Products and Chemicals.
[5] Tegostab B-8404 surfactant, available from Th. Goldschmidt.
[6] A polymeric MDI having an equivalent weight of 134 and a functionality of 2.7

The resulting foam has a core density of ~410 kg/m$^3$, a compressive modulus (ASTM 1621D) of ~350 MPa, a compressive strength (ASTM 1621D) of ~15 MPa and a glass transition temperature of ~202° C. The foam has a storage modulus of ~400 MPa at 0° C. and ~275 MPa at 100° C. The ratio of 100° C. storage modulus to 0° C. storage modulus is ~0.69. The ratio of 0° C. storage modulus to density is ~0.98.

A 2.5-mm layer of a thermally expandable adhesive as described in U. S. Published Patent Application 2004/0131839 is applied to the surface of the core. The resulting SFI structure is placed into a T-shaped sheet metal cavity sized so that a ~2 mm clearance exists between the interior of the cavity and the surface of the SFI. The assembly is then baked at ~204° C. for one hour to expand the adhesive.

The assembly is thereafter cooled to room temperature over a 24 hour period, and cut into strips to examine the foam core. There are virtually no stress cracks in the foam core.

EXAMPLE 2

Example 1 is repeated using the following foam formulation to make the core:

TABLE 2

| Component | Parts by Weight |
|---|---|
| Polyether Polyol A[1] | 25.0 |
| Polyether Polyol B[2] | 67.05 |
| Catalyst C[3] | 1.2 |
| Catalyst D[4] | 1.7 |
| Catalyst E[5] | 2.1 |
| Silicone Surfactant A[6] | 2.8 |
| Water | 0.15 |
| Polyisocyanate A[7] | To 250 Index |

[1,2] See notes 1 and 2 from preceding table.
[3] A commercial polyurethane catalyst containing pentamethyldiethylene triamine, sold as Polycat ® 5 by Air Products and Chemicals.
[4] A commercial polyurethane catalyst containing triethylene diamine, sold as Dabco ® 33LV by Air Products and Chemicals.
[5] A commercial trimerization catalyst containing 2-hydroxypropyl trimethyl formate, sold as Dabco ® TMR2 by Air Products and Chemicals.
[6,7] See notes 5 and 6 of Table 1.

The resulting foam has a core density of ~400 kg/m$^3$, a compressive modulus (ASTM 1621D) of ~350 MPa, a compressive strength (ASTM 1621D) of ~12 MPa and a glass transition temperature of ~230° C. The foam has a storage modulus of ~295 MPa at 0° C. and ~195 MPa at 100° C. The ratio of 100° C. storage modulus to 0° C. storage modulus is ~0.66. The ratio of 0° C. storage modulus to density is ~0.80.

The core is used to form an SFI and evaluated in a T-shaped mold as described in Example 1. The core develops only two small (~25 mm long, 0.3 mm wide) cracks during the thermal expansion process.

EXAMPLE 3

Example 3 is repeated using the following foam formulation to make the core:

TABLE 3

| Component | Parts by Weight |
|---|---|
| Polyether Polyol A[1] | 25.0 |
| Polyether Polyol B[2] | 65.85 |
| Catalyst C[3] | 1.2 |
| Catalyst D[4] | 1.7 |
| Catalyst E[5] | 2.7 |
| Silicone Surfactant A[6] | 2.8 |
| Water | 0.75 |
| Polyisocyanate A[7] | To 250 Index |

[1]–[7]See notes 1–7 of Table 2.

A 120-gram T-shaped molding is made from this formulation, using the same general method described in Example 1.

The resulting foam has a core density of ~143 kg/m$^3$, a compressive modulus (ASTM 1621D) of ~61 MPa, a compressive strength (ASTM 1621D) of ~2 MPa and a glass transition temperature of ~226° C. The foam has a storage modulus of ~92 MPa at 0° C. and ~65 MPa at 100° C. The ratio of 100° C. storage modulus to 0° C. storage modulus is ~0.71. The ratio of 0° C. storage modulus to density is ~0.64.

The resulting core is covered with thermally expandable adhesive as described in Example 1, inserted into a T-shaped molding and heated at 177° C. for one hour. The core is used to form an SFI and evaluated in a sheet metal cavity as described in Example 1. The core develops only two small (~25 mm long, 0.3 mm wide) cracks during the thermal expansion process.

What is claimed is:

1. A reinforced structural member comprising a structural member having a cavity containing a reinforcing foam, wherein the reinforcing foam is a structural thermoset polymer foam (a) having a density of from 80 to 650 kg/m$^3$, (b) having a storage modulus such that the ratio of the storage modulus at 0° C., expressed in MPa, divided by the density of the thermoset polymer foam, expressed in kg/m$^3$, is at least 0.4, and (c) having a storage modulus such that the ratio of the storage modulus of the thermoset polymer foam at 100° C. divided by the storage modulus of the thermoset polymer foam at 0° C. is at least 0.5, such storage moduli being measured according to ASTM D 4065-01 on a 12 mm wide×3.5 mm thick×17.5 mm single cantilever sample, under conditions of 1 Hz and a heating rate of 2° C./min, and said density being a core density measured according to ASTM D 3574 at 22±3° C.

2. The reinforced structural member of claim 1, wherein the ratio of the storage modulus at 0° C., expressed in MPa, divided by the density of the thermoset polymer foam, expressed in kg/m$^3$, is from 0.6 to 1.2 and the ratio of the storage modulus of the thermoset polymer foam at 100° C. divided by the storage modulus of the thermoset polymer foam at 0° C. is from 0.65 to 1.0.

3. The reinforced structural member of claim 2 wherein the thermoset polymer foam is a polyurethane-isocyanurate foam.

4. The reinforced structural member of claim 3, wherein the thermoset polymer foam has a density of from 300 to 450 kg/m$^3$.

5. The reinforced structural member of claim 1 wherein the structural member is metal.

6. The reinforced structural member of claim 5 wherein the structural member is an automotive part, assembly or sub-assembly.

7. The reinforced structural member of claim 1 wherein the thermoset polymer foam is adhered to the structural member with a thermally expanded adhesive.

8. The reinforced structural member of claim 2 wherein the reinforcing foam is a structural polyurethane-isocyanurate polymer foam which is formed in the reaction of components (a) and (b) in the presence of a blowing agent wherein:
   component (a) includes a polyol or mixture thereof, the polyol or mixture thereof having an average hydroxyl functionality of at least 3.5 hydroxyl groups/molecule and a hydroxyl equivalent weight of from 170 to 220;
   component (b) includes an organic polyisocyanate or mixture thereof, the polyisocyanate or mixture thereof having an isocyanate equivalent weight of from 130 to 170 and an average isocyanate functionality of at least 2.5 isocyanate groups/molecule;
   and further wherein the isocyanate index is at least 200.

9. The reinforced structural member of claim 8 wherein the structural member is metal.

10. The reinforced structural member of claim 9 wherein the structural member is an automotive part, assembly or sub-assembly.

11. The reinforced structural member of claim 8 wherein the polyurethane-isocyanurate polymer foam is adhered to the structural member with a thermally expanded adhesive.

12. A process for preparing a reinforced structural member of claim 1 comprising applying a thermoset polymer foam-forming composition to the cavity of the structural member and subjecting the composition to conditions such that the foam-forming composition cures in place to form a thermoset polymer foam adherent to the cavity.

13. A method for preparing a reinforced structural member of claim 1 which comprises (a) applying a thermally expandable adhesive to at least a portion of the outer surface of a structural thermoset polymer foam to form a reinforcing insert, (b) placing the reinforcing insert into a cavity of a structural member, and (b) exposing the thermally expandable adhesive to a temperature sufficient to cause the adhesive to expand and adhere the insert core to the structural member.

14. A reinforcing insert for reinforcing a structural member having a cavity, the reinforcing insert comprising a core of a structural thermoset polymer foam having a thermally expandable adhesive upon at least a portion of its outer surface, wherein (1) the thermoset polymer foam has a density of from 80 to 650 kg/m$^3$, (2) the thermoset polymer foam has a storage modulus such that the ratio of the storage modulus at 0° C., expressed in MPa, divided by the density of the thermoset polymer foam, expressed in kg/m$^3$, is at least 0.4, and (c) the ratio of the storage modulus of the thermoset polymer foam at 100° C. divided by the storage modulus of the thermoset polymer foam at 0° C. is at least 0.5, such storage moduli being measured according to ASTM D 4065-01 on a 12 mm wide×3.5 mm thick×17.5 mm single cantilever sample, under conditions of 1 Hz and a heating rate of 2° C./min, and said density being a core density measured according to ASTM D 3574 at 22±3° C.

15. The reinforcing insert of claim 14, wherein the ratio of the storage modulus at 0° C., expressed in MPa, divided by the density of the thermoset polymer foam, expressed in kg/m³, is from 0.6 to 1.2 and the ratio of the storage modulus of the thermoset polymer foam at 100° C. divided by the storage modulus of the thermoset polymer foam at 0° C. is from 0.65 to 1.0.

16. The reinforcing insert of claim 15, wherein the thermoset polymer foam is a polyurethane-isocyanurate foam.

17. The reinforcing insert of claim 16, wherein the thermoset polymer foam has a density of from 300 to 450 kg/m³.

18. The reinforcing insert of claim 17 wherein the polyurethane-isocyanurate polymer foam is formed in the reaction of components (a) and (b) in the presence of a blowing agent, wherein:

component (a) includes a polyol or mixture thereof, the polyol or mixture thereof having an average hydroxyl functionality of at least 3.5 hydroxyl groups/molecule and a hydroxyl equivalent weight at from 170 to 220;

component (b) includes an organic polyisocyanate or mixture thereof, the polyisocyanate or mixture thereof having an isocyanate equivalent weight of from 130 to 170 and an average isocyanate functionality of at least 2.5 isocyanate groups/molecule;

and further wherein the isocyanate index as at least 200.

* * * * *